US 9,405,440 B2

(12) United States Patent
Tateno

(10) Patent No.: US 9,405,440 B2
(45) Date of Patent: Aug. 2, 2016

(54) INFORMATION PROCESSING APPARATUS, INFORMATION PROCESSING METHOD, AND PROGRAM

(71) Applicant: SONY CORPORATION, Tokyo (JP)

(72) Inventor: Kei Tateno, Tokyo (JP)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 13/859,103

(22) Filed: Apr. 9, 2013

(65) Prior Publication Data

US 2013/0318460 A1 Nov. 28, 2013

(30) Foreign Application Priority Data

May 28, 2012 (JP) ................................. 2012-120724

(51) Int. Cl.
*G06F 3/048* (2013.01)
*G06F 3/0484* (2013.01)
*G06F 17/30* (2006.01)

(52) U.S. Cl.
CPC ........ *G06F 3/0484* (2013.01); *G06F 17/30997* (2013.01)

(58) Field of Classification Search
None
See application file for complete search history.

(56) References Cited

U.S. PATENT DOCUMENTS

| 8,311,973 | B1 * | 11/2012 | Zadeh | G06N 7/02 706/62 |
| 2008/0214148 | A1 * | 9/2008 | Ramer | G06F 17/30749 455/414.1 |
| 2008/0227063 | A1 * | 9/2008 | Kenedy | G06Q 40/00 434/219 |
| 2010/0164957 | A1 * | 7/2010 | Lindsay | G06Q 10/10 345/440 |
| 2011/0072052 | A1 * | 3/2011 | Skarin | G06Q 10/10 707/794 |
| 2012/0197750 | A1 * | 8/2012 | Batra | G06F 17/30592 705/26.7 |
| 2012/0233253 | A1 * | 9/2012 | Ricci | G06Q 50/01 709/204 |
| 2013/0073995 | A1 * | 3/2013 | Piantino | G06Q 50/01 715/764 |
| 2013/0097236 | A1 * | 4/2013 | Khorashadi | H04H 60/25 709/204 |
| 2013/0197970 | A1 * | 8/2013 | Aaskov | G06Q 30/02 705/7.31 |

FOREIGN PATENT DOCUMENTS

| JP | 4524709 | 6/2010 |
| JP | 2010-200648 | 9/2010 |

OTHER PUBLICATIONS

Su et al., A Survey of Collaborative Filtering Techniques, "Advances in Artificial Intelligence," vol. 2009, Hindawi Publishing Corporation, Article ID 421425.

* cited by examiner

*Primary Examiner* — Hua Lu
(74) *Attorney, Agent, or Firm* — Paratus Law Group, PLLC

(57) ABSTRACT

There is provided an information processing apparatus including a statistical amount selecting unit that selects, from a plurality of statistical amounts showing features of users, a statistical amount to be used based on distribution of each of the statistical amounts, a priority setting unit that sets priorities of a plurality of users, based on the selected statistical amount, and a display control unit that controls display of the plurality of users or a plurality of pieces of information from the plurality of users, based on the set priorities.

13 Claims, 5 Drawing Sheets

INFORMATION PROCESSING APPARATUS, INFORMATION PROCESSING METHOD, AND PROGRAM

BACKGROUND

The present disclosure relates to an information processing apparatus, an information processing method, and a program and more particularly, to an information processing apparatus, an information processing method, and a program that are used suitably when information from other users is displayed in a form of a list.

Recently, it is general to arrange and display activities (for example, remarks and feedback with respect to various content) of other users in various social services like a timeline of Twitter (registered trademark) and a news feed of Facebook (registered trademark). As a result, behaviors of other users can be listed. However, if the number of other users following a user such as friends increases, a large amount of information may be displayed at a time, which makes it difficult to read the information.

Therefore, a method of arranging the activities of other users according to priorities and displaying the activities has been suggested (for example, refer to JP 2010-200648A).

In addition, as methods of changing information provided from behaviors of users, a normal recommendation method (for example, refer to Su, X., Khoshgoftaar, T. M., "A Survey of Collaborative Filtering Techniques", Advances in Artificial Intelligence, 2009) and JP 4524709B are known. According to technology described in JP 4524709B, provision of information is performed in consideration of a point of view of whether items which a user is apt to evaluate are famous or evaluation tendencies of users for the items such as interlocking conditions with evaluations of all users.

SUMMARY

However, a specific method of setting priorities is not described in JP 2010-200648A.

Because the activities of the users are not exposed to evaluations of a number of users, differently from general content, it is difficult to apply the technology described in JP 4524709B to when the activities of other users are displayed.

It is desirable to enable a user having a specific feature or information from the user to be preferentially viewed.

According to an embodiment of the present technology, there is provided an information processing apparatus including a statistical amount selecting unit that selects, from a plurality of statistical amounts showing features of users, a statistical amount to be used based on distribution of each of the statistical amounts, a priority setting unit that sets priorities of a plurality of users, based on the selected statistical amount, and a display control unit that controls display of the plurality of users or a plurality of pieces of information from the plurality of users, based on the set priorities.

The priority setting unit may set the priorities of the plurality of users, based on a value designated with respect to the selected statistical amount.

The priority setting unit may set a priority of a user whose statistical amount is within a range of the designated value high or low.

The display control unit may perform control in a manner that a user interface for designating the value of the selected statistical amounts is displayed together with the plurality of users or the plurality of pieces of information.

The display control unit may control display order of the plurality of users or the plurality of pieces of information, based on the priorities.

The display control unit may extract a user or information to be displayed, from the plurality of users or the plurality of pieces of information, based on the priorities.

The display control unit may perform control in a manner that a value of the selected statistical amount of each user is displayed together with the plurality of users.

The priority setting unit may set high a priority of a user whose similarity of the selected statistical amount with the plurality of users or users viewing the plurality of pieces of information are high.

The statistical amount selecting unit may select the statistical amounts to be used, based on an extent of the distribution of the statistical amount in the plurality of users with respect to distribution of the statistical amount in a specific group including the plurality of users.

According to an embodiment of the present technology, there is provided an information processing method including selecting, from a plurality of statistical amounts showing features of users, a statistical amount to be used based on distribution of each of the statistical amounts, setting priorities of a plurality of users, based on the selected statistical amount, and controlling display of the plurality of users or a plurality of pieces of information from the plurality of users, based on the set priorities.

According to an embodiment of the present technology, there is provided a program for causing a computer to execute processing including selecting, from a plurality of statistical amounts showing features of users, a statistical amount to be used based on distribution of each of the statistical amounts, setting priorities of a plurality of users, based on the selected statistical amount, and controlling display of the plurality of users or a plurality of pieces of information from the plurality of users, based on the set priorities.

According to the embodiment of the present disclosure, the statistical amounts to be used are selected from the plurality of statistical amounts showing the features of the users, based on the distributions of the individual statistical amounts, the priorities of the plurality of users are set based on the selected statistical amounts, and the display of the plurality of users or the plurality of pieces of information from the plurality of users is controlled based on the set priorities.

According to the embodiments of the present disclosure described above, a user having a specific feature or information from the user can be preferentially viewed.

DETAILED DESCRIPTION OF THE EMBODIMENT(S)

Figure 1:
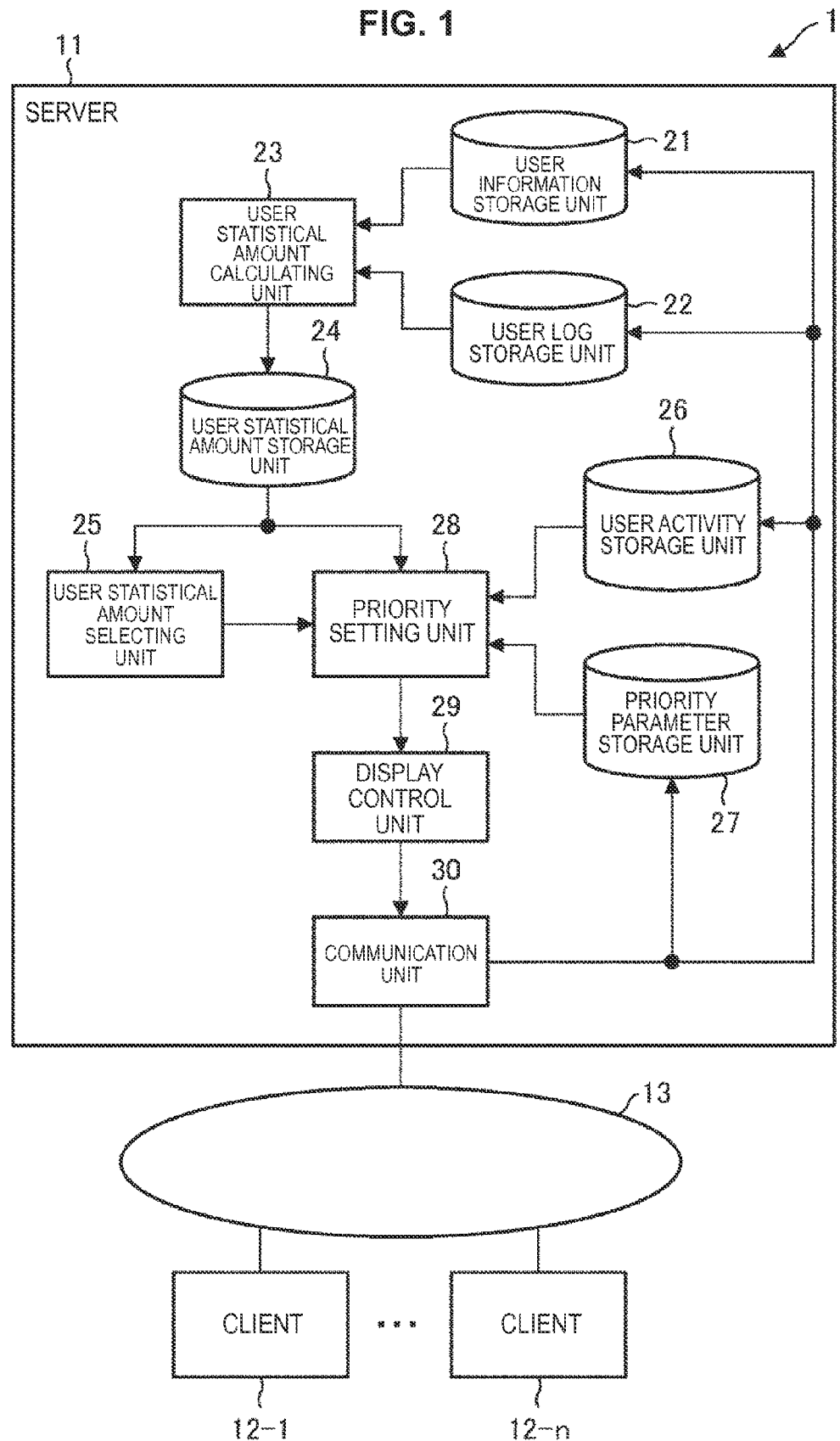
FIG. 1 is a block diagram showing an embodiment of an information processing system to which the present disclosure is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.
1. Embodiment
2. Modifications

1. Embodiment

Configuration Example of Information Processing System 1

FIG. 1 is a block diagram showing an embodiment of an information processing system to which the present disclosure is applied.

An information processing system 1 includes a server 11 and clients 12-1 to 12-n. The server 11 and the clients 12-1 to 12-n are mutually connected through a network 13.

Hereinafter, when it is not necessary to individually distinguish the clients 12-1 to 12-n, the clients 12-1 to 12-n are simply referred to as the clients 12.

The server 11 provides a social service to each client 12. If the social service has at least a function of displaying activities of other users on the client 12, a kind of the social service is not limited in particular. Also, a kind of activity displayed on each client 12 is not limited in particular.

Also, a method of displaying activity is not limited in particular. For example, activities of other users which a user follows may be arranged in chronological order and may be displayed, such that the activities are viewed by Twitter (registered trademark). Alternatively, activities with respect to content becoming viewing objects may be arranged in chronological order and may be displayed, such that the activities are viewed by YouTube (registered trademark). Alternatively, activities may be dynamically displayed according to advancement of content becoming viewing objects, such that the activities are viewed by Niconico (registered trademark).

Further, activities that are given from each user to the social service include not only activities given intentionally from the users, such as a remark, a posting such as an image, and feedback to various content, but also activities given regardless of the intention of the users, such as position information.

Hereinafter, a screen that displays the activities of the users is called a view. On the view, the activity of the corresponding user as well as the activities of other users may be displayed. Hereinafter, a user who displays the view and reads the view is called an active user. Hereinafter, a view that is to be displayed by the active user or is displayed by the active user is called an active view. Hereinafter, a user of a source of the activity that is displayed on the active view is called a user in the active view. Hereinafter, content that is displayed on the active view is called content in the active view.

The server 11 includes a user information storage unit 21, a user log storage unit 22, a user statistical amount calculating unit 23, a user statistical amount storage unit 24, a user statistical amount selecting unit 25, a user activity storage unit 26, a priority parameter storage unit 27, a priority setting unit 28, a display control unit 29, and a communication unit 30. In FIG. 1, only portions of the server 11 relating to display of an active view are mainly shown and the other portions are not partially shown.

The user information storage unit 21 collects user information (for example, private information) of each user who participates in a social service, from information transmitted from each client 12 to the communication unit 30 through the network 13, and stores the user information.

The user log storage unit 22 collects a log on the social service (hereinafter, referred to as a user log) of each user who participates in the social service, from the information transmitted from each client 12 to the communication unit 30 through the network 13, and stores the user log.

The user statistical amount calculating unit 23 calculates a statistical amount (hereinafter, referred to as a user statistical amount) showing a feature of each user from various viewpoints, on the basis of the user information stored in the user information storage unit 21 and the user log stored in the user log storage unit 22. The user statistical amount calculating unit 23 stores the calculated user statistical amount in the user statistical amount storage unit 24.

A specific example of the user statistical amount will be described below.

The user statistical amount selecting unit 25 selects the user statistical amount used for setting the priority of the user in the active view, from the user statistical amounts stored in the user statistical amount storage unit 24. The user statistical amount selecting unit 25 notifies the priority setting unit 28 of the selected user statistical amount.

The user activity storage unit 26 collects information regarding the activity of each user who participates in the social service, from the information transmitted from each client 12 to the communication unit 30 through the network 13, and stores the information.

The priority parameter storage unit 27 acquires a priority parameter transmitted from the client 12 displaying the active view to the communication unit 30 through the network 13 and stores the priority parameter. The priority parameter is a parameter that shows a rule used for setting the priority of the user in the active view, which will be described in detail below.

The priority setting unit 28 sets the priority of the user in the active view, on the basis of the user statistical amount selected by the user statistical amount selecting unit 25 and the priority parameter stored in the priority parameter storage unit 27. The priority setting unit 28 reads information regarding the activity displayed on the active view, from the user activity storage unit 26. The priority setting unit 28 adds the priority of the user corresponding to the source of the activity to the read information regarding the activity and supplies the information to the display control unit 29.

The display control unit 29 generates data to display the active view (hereinafter, referred to as active view display data). At this time, the display control unit 29 sorts or filters the activity displayed on the active view, on the basis of the priority selected by the priority setting unit 28. The display control unit 29 transmits the active view display data to the client 12 through the communication unit 30 and the network 13 and controls display of the active view in the client 12.

The communication unit 30 performs communication with each client 12 through the network 13 and transmits and receives various information or commands regarding the social service.

[User Activity Display Control Processing]

Next, active view display control processing that is executed by the server 11 will be described with reference to a flowchart of FIG. 2.

In step S1, the user statistical amount calculating unit 23 calculates the user statistical amount of each user, on the basis of the user information stored in the user information storage unit 21 or the user log stored in the user log storage unit 22. In addition, the user statistical amount calculating unit 23 stores the calculated user statistical amount in the user statistical amount storage unit 24.

In this case, a specific example of the user statistical amount will be described.

For example, the number of friends, the number of followers, the number of followees, and the number of entire remarks can be used as the user statistical amount.

The number of friends shows the number of other users who make a friendship with the active user on the social service, by mutual authentication of the active user and other users. A mutual authentication method, a mutual authentication form, and a mutual authentication effect are not limited in particular.

The number of followers shows the number of other users who follow the active user, that is, the number of other users who read the activity of the active user.

The number of followees shows the number of other users which the active user follows, that is, the number of other users of which activities are read by the active user.

The number of entire remarks shows a total number of remarks of the active user on the social service. A collection period of the number of entire remarks may be an entire period after the active user participates in the social service or a limited period (for example, past one month).

In the case of the social service including the activities with respect to the content, the number of content remarks, the number of intra-genre content remarks, content reproduction frequency, intra-genre content reproduction frequency, a specialty level, and a property can be adopted as the user statistical amount. In this case, use, a purchase, and an evaluation of content, a remark with respect to the content, and read of information regarding the content are assumed as the activities with respect to the content. A kind of content is not limited to a specific kind.

The number of content remarks shows the number of remarks of the user with respect to the content in the active view.

The number of intra-genre content remarks shows the total number of remarks of the user with respect to a content group of a genre to which the content in the active view belongs.

The content reproduction frequency shows the number of times of reproducing the content in the active view by the user.

The intra-genre content reproduction frequency shows the total number of times of reproducing a content group of a genre to which the content in the active view belongs, by the user.

The number of intra-genre content possessions shows the number of content groups of a genre to which the content in the active view belongs, which are possessed by the user. The number of intra-genre content possessions can be adopted when the social service is a non-subscription service.

The specialty level shows a level of a specialty of remark content of the user. The specialty level is measured using a content rate of words registered in a technical term dictionary prepared in advance. In the case of Japanese, the specialty level is measured using content rates of katakana words, long kanji phrases, and terms of other languages.

The property shows a property of the user that is expressed on the basis of evaluations with respect to the content. For example, a lowbrow degree and a reputation intention degree that are described in JP 4524709B can be used as the property.

In step S2, the user statistical amount selecting unit 25 selects the user statistical amount that is used for setting the priority.

For example, when distributions of the user statistical amounts of the users in the active view are narrower than distributions of the user statistical amounts of all users who participate in the social service (hereinafter, simply referred to as all users), that is, when variations of the user statistical amounts of the users in the active view are smaller than variations of the user statistical amounts of all users, the activities of the users who have the similar user statistical amounts are gathered in the active view. Therefore, even though the priorities of the users in the active view are set using the user statistical amounts, it is difficult to make the priorities of the users different from each other, which results in rarely contributing to sorting or filtering of the activities displayed on the active view.

Meanwhile, when the distributions of the user statistical amounts of the users in the active view are wider than the distributions of the user statistical amounts of all users, that is, when the variations of the user statistical amounts of the users in the active view are larger than the variations of the user statistical amounts of all users, the activities of the users who have the various user statistical amounts are gathered in the active view. Therefore, even though the priorities of the users in the active view are set using the user statistical amounts, it is easy to make the priorities of the users different from each other, which results in greatly contributing to sorting or filtering of the activities displayed on the active view.

However, because standards of the individual user statistical amounts are different, extents of the distributions may not be simply compared using the dispersions or the standard deviations of the individual user statistical amounts. Therefore, the user statistical amount selecting unit 25 calculates the relative standard deviation (hereinafter, referred to as the relative SD) functioning as an index to compare the extents of the distributions of the individual user statistical amounts, with respect to the individual user statistical amounts. The relative SD is a ratio of the standard deviation of the user statistical amounts in the users in the active view, with respect to the standard deviation of the user statistical amounts in all users.

The user statistical amount selecting unit 25 selects the user statistical amounts of the predetermined number in which the relative SD is higher, as the user statistical amounts used for setting the priority. The user statistical amount selecting unit 25 notifies the priority setting unit 28 of the selected user statistical amounts.

Figures 2, 3:
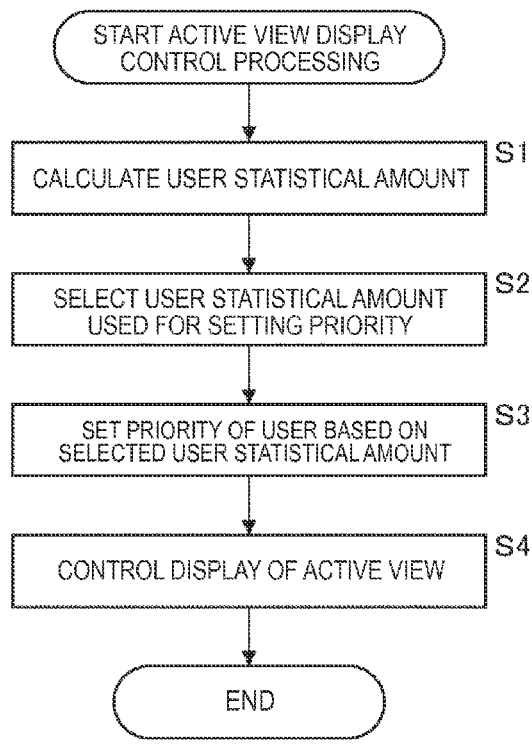
FIG. 2 is a flowchart showing active view display control processing.
FIG. 3 is a diagram showing a method of calculating a relative SD.

FIG. 3 shows an example of distributions of the number of friends, the number of entire remarks, and the genre reproduction frequency, among the user statistical amounts described above. A relative SD of the number of friends becomes 0.35 by dividing 15.3 to be the SD (standard deviation) in the users in the active view by 43.5 to be the SD in all users. A relative SD of the number of entire remarks becomes 1.03 by dividing 212.3 to be the SD in the users in the active view by 205.3 to be the SD in all users. A relative SD of the genre reproduction frequency becomes 2.67 by dividing 174.4 to be the SD in the users in the active view by 65.2 to be the SD in all users.

For example, when the user statistical amounts are compared simply by the SD, the number of entire remarks becomes the user statistical amount in which the distribution in the users in the active view is widest. However, because the distribution in the users in the active view and the distribution in all users are similar to each other, the number of entire remarks rarely contributes to sorting or filtering of the activities displayed on the active view, as described above.

Meanwhile, when the user statistical amounts are compared by the relative SD, the genre reproduction frequency becomes the user statistical amount in which the distribution in the users in the active view is widest. Because the distribution in the users in the active view is wider than the distribution in all users, the genre reproduction frequency greatly contributes to sorting or filtering of the activities displayed on the active view, as described above.

As such, if the relative SD is used, the user feature amount in which an effect of contributing to sorting or filtering of the activities displayed on the active view is large can be selected.

In step S3, the priority setting unit 28 sets the priority of the user, on the basis of the selected user statistical amount. As methods of setting the priority of the user, a method of setting the priority of the user automatically and a method of setting the priority of the user manually by the active user are known.

First, an example of the method of setting the priority automatically will be described.

The priority setting unit 28 calculates the similarity of the active user and each user in the active view, using the selected user statistical amount. For example, the priority setting unit 28 calculates a Euclidean distance between the active user and each user in the active view as the similarity, using the selected user statistical amount. The priority setting unit 28 sets the priority of the user having the high similarity high and sets the priority of the user having the low similarity low.

Alternatively, a method of using setting values of the priorities of other users associated with the active user (for example, users who make a friendship with the active user on the social service or users who follow the active users) is considered.

Next, an example of the method of setting the priority manually by the active user will be described.

For example, the priority setting unit 28 sets the priority of the user in the active view, on the basis of the priority parameter set by the active user and stored in the priority parameter storage unit 27.

The priority parameter is represented by a value of the user statistical amount designated by the active user. In this case, the priority setting unit 28 applies the weight based on the designated value of the user statistical amount and sets the priority of the user in the active view. For example, the priority setting unit 28 sets the priority of the user of which the user statistical amount is included in a range of the designated value high or sets the priority low. The priority setting unit 28 sets the priority of the user of which the user statistical amount is similar to a center value of the range of the designated value high or sets the priority low.

Timing at which the priority parameter is set may be set, regardless of display timing of the active view, or may be set before the display of the active view or during the display of the active view. A specific example of the method of setting the priority parameter during the display of the active view will be described below with reference to FIGS. 5 and 6.

For example, the weight between the used user statistical amounts may be set as the priority parameter. That is, the user statistical amount on which the weight is laid may be set when the priority is set.

The priority setting unit 28 reads information regarding the activities becoming candidates displayed on the active view, from the user activity storage unit 26. In addition, the priority setting unit 28 adds the priorities of the users corresponding to the sources of the activities to the read information regarding the activities and supplies the information to the display control unit 29. Thereby, the priority based on the user of the source is set to each activity.

In step S4, the display control unit 29 controls the display of the active view. Specifically, the display control unit 29 generates active view display data to display the active view and transmits the active view display data to the client 12 becoming a display object of the active view, through the communication unit 30 and the network 13. The client 12 that has received the active view display data displays the active view on the basis of the received active view display data.

At this time, the display control unit 29 controls the display of the active view, such that the activity having the high priority is preferentially displayed or is emphasized and displayed, on the basis of the priority set to each activity (the user of the source of the activity). For example, a method of setting the display order of the activity having the high priority to a high rank is considered. Alternatively, a method of extracting the activity in which the priority is equal to or more than the predetermined threshold value and displaying the activity or displaying the activity other than the activity in which the priority is less than the predetermined threshold value is considered. Alternatively, a method of changing a display size, a display position, a color, and a display effect according to the priority is considered.

The display control unit 29 may display a user interface to set the priority parameter in the active view, according to necessity.

In this case, a display example of the active view will be described with reference to FIGS. 4 to 6.

Figure 4:
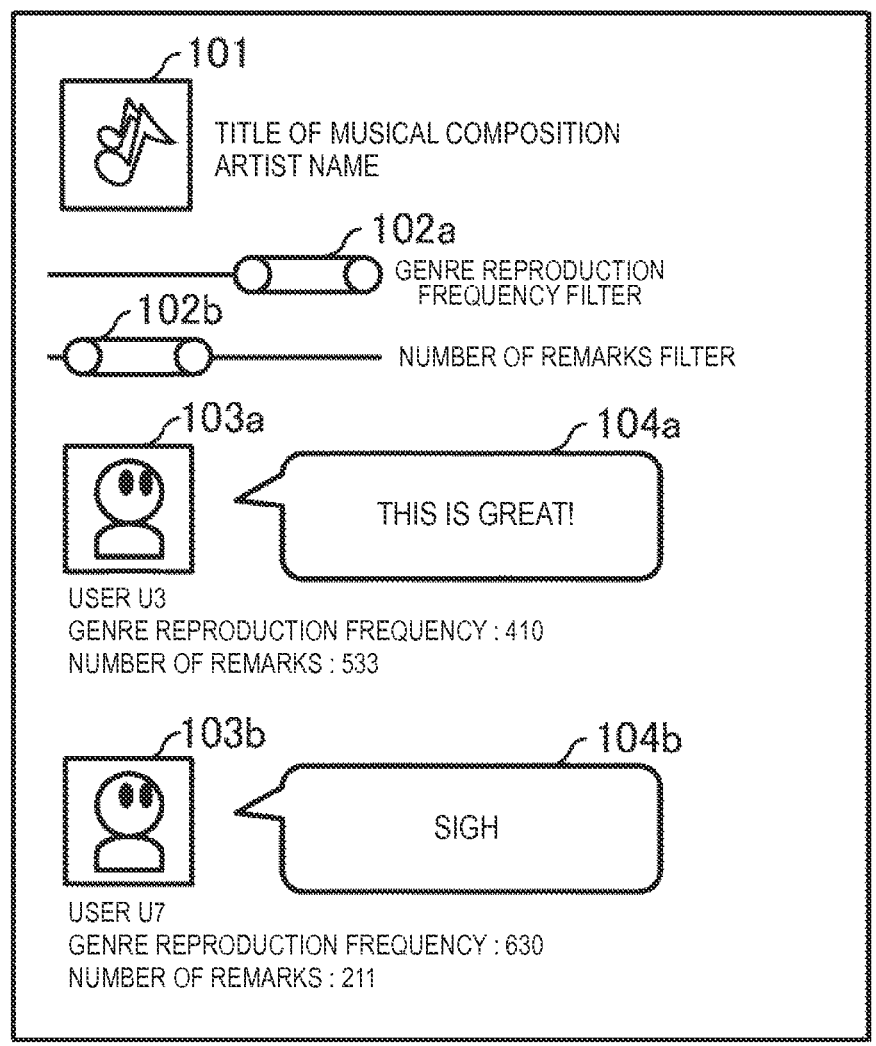
FIG. 4 is a diagram showing a first example of an active view.

FIG. 4 shows an example of the active view that displays the activity of each user with respect to the content. Specifically, FIG. 4 shows an example of the active view when a remark of each user with respect to a musical composition is displayed on a reproduction screen of the musical composition.

On an upper end of the active view, information regarding a musical composition in a reproduction state is displayed. Specifically, an icon 101 showing a musical composition, a title of the musical composition, and an artist name are displayed.

Under the icon 101, the title of the musical composition, and the artist name, sliders 102a and 102b to set the value of the user statistical amount selected by the user statistical amount selecting unit 25 are displayed. In FIG. 4, an example of the case in which the genre reproduction frequency and the number of remarks are selected is shown.

The slider 102a can be slid to left and right sides and is used for setting (a range of) a value of the genre reproduction frequency. If the slider 102a is slid to the left side, a setting value decreases and if the slider 102a is slid to the right side, the setting value increases.

Likewise, the slider 102b can be slid to the left and right sides and is used for setting (a range of) a value of the number of remarks. If the slider 102b is slid to the left side, a setting value decreases and if the slider 102b is slid to the right side, the setting value increases.

The (ranges of) values of the genre reproduction frequency and the number of remarks that are set by the sliders 102a and 102b are transmitted as the priority parameters from the client 12 to the server 11 through the network 13.

Under the sliders 102a and 102b, the activity of each user (in this case, remark with respect to the musical composition) is arranged from the upper side in order of the high priorities and is displayed. In this example, remarks of users U3 and U7 are displayed.

Specifically, an icon 103a that shows the user U3 is displayed on a left end and a user name and values of a genre reproduction frequency and the number of remarks of the user U3 are displayed under the icon 103a. A balloon 104a is displayed on a right side of the icon 103a and the remark of the user U3 with respect to the musical composition in a reproduction state is displayed in the balloon 104a.

Under the user name and the values of the genre reproduction frequency and the number of remarks of the user U3, an icon 103b that shows the user U7 is displayed on a left end. Under the icon 103b, a user name and values of a genre reproduction frequency and the number of remarks of the user U7 are displayed. A balloon 104b is displayed on a right side of the icon 103b and the remark of the user U7 with respect to the musical composition in a reproduction state is displayed in the balloon 104b.

The active user operates the sliders 102a and 102b, so that the active user can sort remarks of other users displayed with respect to the musical composition in a reproduction state or change the display order, on the basis of the user statistical amount of each user. For example, only the remarks of the user in which the genre reproduction frequency and the number of remarks are in the range designated by the active user can be displayed or displayed in the high rank. Thereby, the active user can preferentially view the remarks of the user having the specific feature. For example, the active user can find a remark to be worth reading for the active user simply and quickly.

The value of the user statistical amount that is used for setting the priority is displayed together with the icon and the remark of the user. Therefore, the active user can know the tendency of the user corresponding to the source of the remarks displayed on the active view or the reason why each remark is displayed in the high rank.

Figure 5:
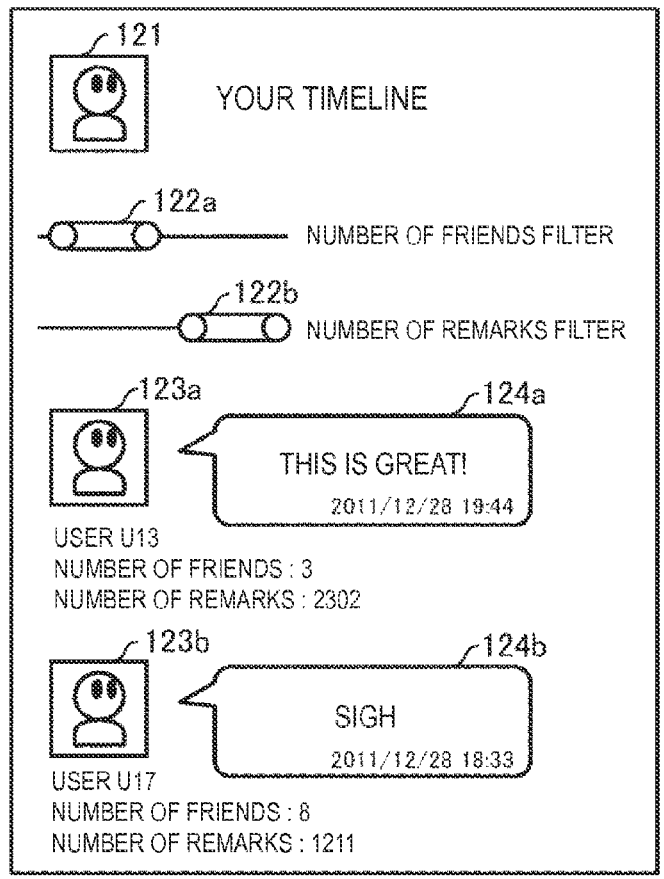
FIG. 5 is a diagram showing a second example of an active view.

FIG. 5 shows an example of an active view that displays a timeline of the active user. In this case, in the timeline, activities of friends of the active users or users which the active user follows are arranged in chronological order and are displayed. As the activities that are displayed on the timeline, information given from the user to the social service or a use history (for example, a recent situation, a posting of a photo, an evaluation with respect to content, position information, and a history of a change of a friendship) is assumed.

On an upper end of the active view, an icon 121 showing an active user and a title (your timeline) are displayed.

Similar to the active view of FIG. 4, sliders 122a and 122b to set values of the user statistical amounts selected by the user statistical amount selecting unit 25 are displayed under the icon 121 and the title. In FIG. 5, an example of the case in which the number of friends and the number of remarks are selected is shown.

The slider 122a can be slid to left and right sides and is used for setting (a range of) a value of the number of friends. If the slider 122a is slid to the left side, a setting value decreases and if the slider 122a is slid to the right side, the setting value increases.

Likewise, the slider 122b can be slid to the left and right sides and is used for setting (a range of) a value of the number of remarks. If the slider 122b is slid to the left side, a setting value decreases and if the slider 122b is slid to the right side, the setting value increases.

The values of the number of friends and the number of remarks that are set by the sliders 122a and 122b are transmitted as the priority parameters from the client 12 to the server 11 through the network 13.

Under the sliders 122a and 122b, activities of other users are displayed in chronological order. In this example, the activities are arranged from the upper side in order of the new activities and are displayed.

Specifically, an icon 123a that shows a user U13 is displayed on a left end and a user name and values of the number friends and the number remarks of the user U13 are displayed under the icon 123a. A balloon 124a is displayed on a right side of the icon 123a and a remark and a remark date and time of the user U13 are displayed in the balloon 124a.

Under the user name and the values of the number of friends and the number of remarks of the user U13, an icon 123b that shows a user U17 is displayed on a left end. Under the icon 123b, a user name and values of number of friends and the number remarks of the user U17 are displayed. A balloon 124b is displayed on a right side of the icon 123b and a remark and a remark date and time of the user S17 are displayed in the balloon 124b.

The active user operates the sliders 122a and 122b, so that the active user can sort the activities of other users displayed on the timeline, on the basis of the user statistical amount of each user. For example, only the remarks of the user in which the number of friends and the number of remarks are in the range designated by the active user can be displayed in chronological order and can be displayed on the timeline. Thereby, the active user can preferentially view the activities of the user having the specific feature. For example, the active user can find the activities of the users to be worth viewing for the active user simply and quickly.

Figure 6:
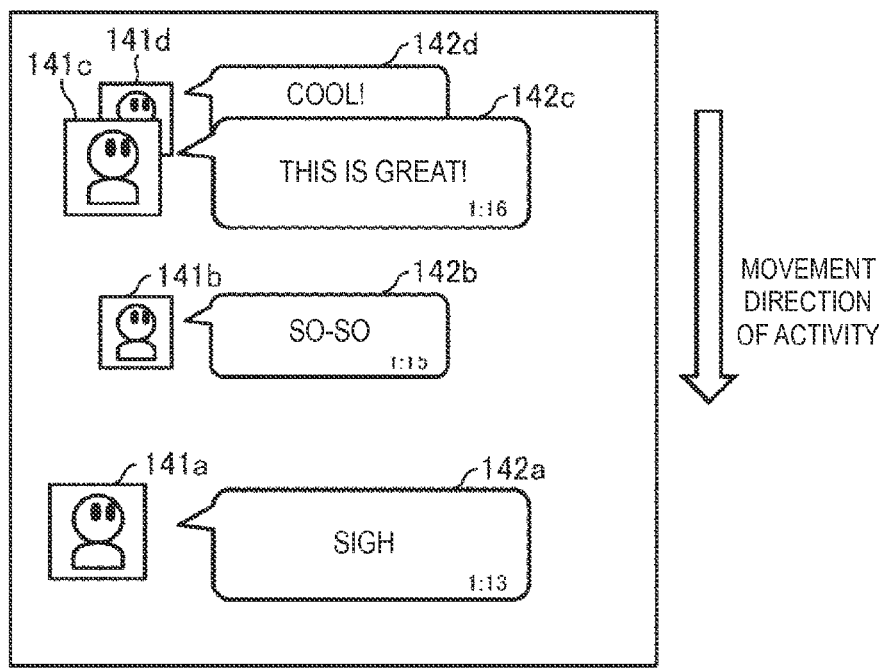
FIG. 6 is a diagram showing a third example of an active view.

FIG. 6 illustrates an example of an active view in which activities are scrolled and displayed according to advancement of content (for example, a musical composition and a moving image) along a time axis. In this example, remarks of users performed after the users designate positions of the content are scrolled from the upper side to the lower side, according to the advancement of the content. A remark of the user having the high priority is displayed big on a forefront surface and a remark of the user having the low priority is displayed small at an inner side of a display position of the remark of the user having the high priority.

Specifically, icons 141a to 141d are icons that show users corresponding to sources of remarks displayed in balloons 142a to 142d displayed on the right sides of the icons 141a to 141d. Levels of the priorities of the users are set in two steps and the icons 141a and 141c are icons showing the users having the high priorities and are displayed bigger than the icons 141b and 141d showing the users having the low priorities. The balloons 142a and 142c that correspond to the icons 141a and 141c are displayed bigger than the balloons 142b and 142d corresponding to the icons 141b and 141d.

When two or more icons and balloons are overlapped and displayed, the icon and the balloon of the user having the high priority are displayed on front surfaces of the display positions of the icon and the balloon of the user having the low priority. For example, the icon 141c and the balloon 142c of the user having the high priority are displayed on the front surfaces of the display positions of the icon 141d and the balloon 142d of the user having the low priority.

In the balloons 142a to 142d, remarks and remark times are displayed.

The icons 141a to 141d and the balloons 142a to 142d move downward according to the advancement of the content.

Thereby, the active user can view the remark of each user on the basis of the remark of the user having the specific feature and the high priority, according to the advancement of the content.

2. Modifications

Hereinafter, modifications of the embodiment of the present disclosure described above will be described.

First Modification

The present disclosure can be applied to the case in which users extracted from users participating in a social service are displayed in a form of a list as well as the case in which the activities are displayed.

For example, when users associated with the active user among users participating in a social service, that is, candidates of friends are displayed in a form of a list, the candidates of the friends can be displayed in display order based on the priorities, by the method described above. Thereby, the active user can easily search the friends that are actually associated with the active user.

Second Modification

When the relative SD is calculated, it is not necessary to set the distributions of the user statistical amounts in all users on the social service as the comparison objects. For example, the distributions of the user statistical amounts in a specific group on the social service including the users in the active view can be set as the comparison objects. As the specific group, a group including users who have common user attributes (for example, a place of residence and a use language) of the users in the active view is assumed.

Third Modification

Other conditions (for example, conditions based on the user attributes) can be combined with the priorities of the users and the users or the activities displayed on the active view can be sorted or filtered.

Fourth Modification

After the priority setting unit 28 sets the priority automatically, the active user can adjust the priority manually by the method ascribed above.

[Configuration Examples of Computer]

The above mentioned series of processes can be executed by hardware, or can be executed by software. In the case where the series of processes is executed by software, a program configuring this software is installed in a computer. Here, for example, a general purpose personal computer that can execute various functions is included in the computer, by installing a computer incorporated into specialized hardware and various programs.

Figure 7:
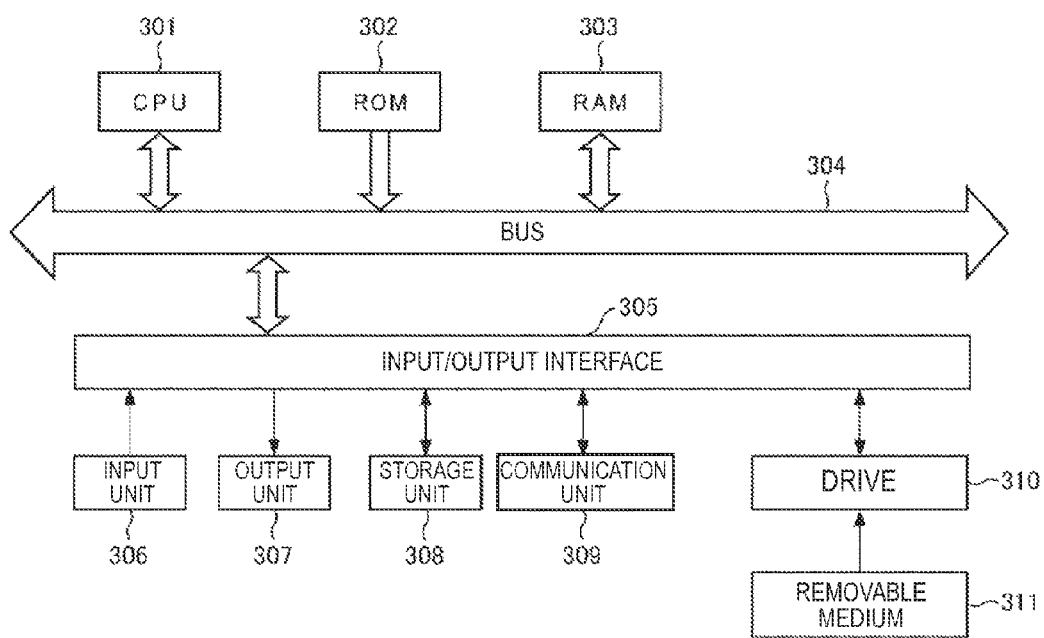
FIG. 7 is a block diagram showing a configuration example of a computer.

FIG. 7 is a block diagram showing a configuration example of hardware of a computer executing the above series of processes by a program.

A CPU (Central Processing Unit) 301, a ROM (Read Only Memory) 302, a RAM (Random Access memory) 303, and a bus 304 are mutually connected in the computer.

An input/output interface 305 is further connected to the bus 304. An input unit 306, an output unit 307, a storage unit 308, a communication unit 309, and a drive 310 are connected to the input/output interface 305.

The input unit 306 includes a keyboard, a mouse, a microphone or the like. The output unit 307 includes a display, a speaker or the like. The storage unit 308 includes a hard disk, a nonvolatile memory or the like. The communication unit 309 includes a network interface or the like. The drive 310 drives a removable medium 311, such as a magnetic disk, an optical disk, a magneto-optical disk, or a semiconductor memory.

In a computer configured such as above, the above mentioned series of processes are executed, for example, by the CPU 301 loading and executing a program, which is stored in the storage unit 308, in the RAM 303 through the input/output interface 305 and the bus 304.

The program executed by the computer (CPU 301) can be, for example, recorded and provided in a removable medium 311 as a packaged medium or the like. Further, the program can be provided through a wired or wireless transmission medium, such as a local area network, the internet, or digital satellite broadcasting.

In the computer, the program can be installed in the storage unit 308 through the input/output interface 305, by installing the removable medium 311 in the drive 310. Further, the program can be received by the communication unit 309 through the wired or wireless transmission medium, and can be installed in the storage unit 308. Additionally, the program can be installed beforehand in the ROM 302 and the storage unit 308.

Note that the program executed by the computer may be a program which performs time series processes, in accordance with the order described in the present disclosure, or may be a program which performs the processes at a necessary timing in parallel, such as when calling is performed.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1) An information processing apparatus including:

a statistical amount selecting unit that selects, from a plurality of statistical amounts showing features of users, a statistical amount to be used based on distribution of each of the statistical amounts;

a priority setting unit that sets priorities of a plurality of users, based on the selected statistical amount; and a display control unit that controls display of the plurality of users or a plurality of pieces of information from the plurality of users, based on the set priorities.

(2) The information processing apparatus according to (1), wherein the priority setting unit sets the priorities of the plurality of users, based on a value designated with respect to the selected statistical amount.

(3) The information processing apparatus according to (2),
wherein the priority setting unit sets a priority of a user whose statistical amount is within a range of the designated value high or low.

(4) The information processing apparatus according to (2) or (3),
wherein the display control unit performs control in a manner that a user interface for designating the value of the selected statistical amounts is displayed together with the plurality of users or the plurality of pieces of information.

(5) The information processing apparatus according to any one of (1) to (4),
wherein the display control unit controls display order of the plurality of users or the plurality of pieces of information, based on the priorities.

(6) The information processing apparatus according to any one of (1) to (5),
wherein the display control unit extracts a user or information to be displayed, from the plurality of users or the plurality of pieces of information, based on the priorities.

(7) The information processing apparatus according to any one of (1) to (6),
wherein the display control unit performs control in a manner that a value of the selected statistical amount of each user is displayed together with the plurality of users.

(8) The information processing apparatus according to any one of (1) to (7),
wherein the priority setting unit sets high a priority of a user whose similarity of the selected statistical amount with the plurality of users or users viewing the plurality of pieces of information are high.

(9) The information processing apparatus according to any one of (1) to (8),
wherein the statistical amount selecting unit selects the statistical amounts to be used, based on an extent of the distribution of the statistical amount in the plurality of users with respect to distribution of the statistical amount in a specific group including the plurality of users.

(10) An information processing method including:
selecting, from a plurality of statistical amounts showing features of users, a statistical amount to be used based on distribution of each of the statistical amounts;
setting priorities of a plurality of users, based on the selected statistical amount; and
controlling display of the plurality of users or a plurality of pieces of information from the plurality of users, based on the set priorities.

(11) A program for causing a computer to execute processing including:
selecting, from a plurality of statistical amounts showing features of users, a statistical amount to be used based on distribution of each of the statistical amounts;
setting priorities of a plurality of users, based on the selected statistical amount; and
controlling display of the plurality of users or a plurality of pieces of information from the plurality of users, based on the set priorities.

The present disclosure contains subject matter related to that disclosed in Japanese Priority Patent Application JP 2012-120724 filed in the Japan Patent Office on May 28, 2012, the entire content of which is hereby incorporated by reference.

What is claimed is:

1. An information processing apparatus comprising:
at least one processor including circuitry configured to
calculate a relative standard deviation functioning as an index to compare distribution of each of a plurality of statistical amounts showing features of users;
select, from the plurality of statistical amounts, a statistical amount to be used based on the distribution of each of the statistical amounts;
set priorities of a plurality of users, based on a value designated with respect to the selected statistical amount being within a range of the designated value; and
control display of the plurality of users or a plurality of pieces of information from the plurality of users, based on the set priorities.

2. The information processing apparatus according to claim 1,
wherein the circuitry further performs control in a manner that a user interface for designating the value of the selected statistical amounts is displayed together with the plurality of users or the plurality of pieces of information.

3. The information processing apparatus according to claim 1,
wherein the circuitry further controls display order of the plurality of users or the plurality of pieces of information, based on the priorities.

4. The information processing apparatus according to claim 1,
wherein the circuitry is further configured to extract a user or information to be displayed, from the plurality of users or the plurality of pieces of information, based on the priorities.

5. The information processing apparatus according to claim 1,
wherein the circuitry further performs control in a manner that a value of the selected statistical amount of each user is displayed together with the plurality of users.

6. The information processing apparatus according to claim 1,
wherein the circuitry further sets high a priority of a user whose similarity of the selected statistical amount with the plurality of users or users viewing the plurality of pieces of information are high.

7. The information processing apparatus according to claim 1,
wherein the selects circuitry further selects the statistical amount to be used, based on an extent of the distribution of the statistical amounts in the plurality of users with respect to distribution of the statistical amounts in a specific group including the plurality of users.

8. The information processing apparatus according to claim 1,
wherein the features of users include number of friends, number of followers, number of followees, number of content remarks, number of intra-genre content remarks, content reproduction frequency, intra-genre content reproduction frequency, a specialty level, and a property.

9. The information processing apparatus according to claim 1,
wherein the circuitry further controls display of a larger icon for a user with a higher priority than for a user with a lower priority.

10. The information processing apparatus according to claim 1,
wherein the circuitry further controls display of an icon of a user with a higher priority to be overlapping an icon for a user with a lower priority.

11. The information processing apparatus according to claim 1,
wherein the circuitry further controls display of a slider for selecting a value of the statistical amount.

12. An information processing method, the method being executed by a processor, and comprising:
calculating a relative standard deviation functioning as an index to compare distribution of each of a plurality of statistical amounts showing features of users;
selecting, from the plurality of statistical amounts, a statistical amount to be used based on the distribution of each of the statistical amounts;
setting priorities of a plurality of users, based on a value designated with respect to the selected statistical amount being within a range of the designated value; and
controlling display of the plurality of users or a plurality of pieces of information from the plurality of users, based on the set priorities.

13. A non-transitory computer-readable storage medium having embodied thereon a program, which when executed by a computer having circuitry, causes the computer to execute a method, the method comprising:
calculating a relative standard deviation functioning as an index to compare distribution of each of a plurality of statistical amounts showing features of users;
selecting, from the plurality of statistical amounts, a statistical amount to be used based on the distribution of each of the statistical amounts;
setting priorities of a plurality of users, based on a value designed with respect to the selected statistical amount being within a range of the designated value; and
controlling display of the plurality of users or a plurality of pieces of information from the plurality of users, based on the set priorities.

* * * * *